United States Patent [19]
Suzuki et al.

[11] Patent Number: 5,972,391
[45] Date of Patent: Oct. 26, 1999

[54] SWINE FEED CONTAINING VITAMIN E AND SPICE

[75] Inventors: Hiroyuki Suzuki; Hiroyuki Nakao; Jino Kikuchi, all of Tochigi, Japan

[73] Assignee: Nisshin Flour Milling Co., Ltd., Tokyo, Japan

[21] Appl. No.: 08/890,751

[22] Filed: Jul. 11, 1997

[30] Foreign Application Priority Data

Jul. 17, 1996 [JP] Japan .................... 8-187293

[51] Int. Cl.$^6$ ........................................... A23K 1/18
[52] U.S. Cl. ................................. 426/2; 426/807
[58] Field of Search ......................... 426/2, 807

[56] References Cited

U.S. PATENT DOCUMENTS

| | | | |
|---|---|---|---|
| 4,665,099 | 5/1987 | Ramallo et al. | 514/763 |
| 4,820,739 | 4/1989 | Ramallo et al. | 514/763 |
| 5,741,508 | 4/1998 | Katsumi et al. | 424/442 |

FOREIGN PATENT DOCUMENTS

| | | |
|---|---|---|
| 0635217 | 1/1995 | European Pat. Off. . |
| 2149513 | 3/1973 | France . |
| 61-001356 | 1/1986 | Japan . |
| 63-000266 | 1/1988 | Japan . |
| 5276878 | 10/1993 | Japan . |
| 6014723 | 1/1994 | Japan . |
| 7031382 | 2/1995 | Japan . |
| 08038071 | 6/1996 | Japan . |
| 1239918 | 6/1995 | U.S.S.R. . |
| 2118420 | 11/1983 | United Kingdom . |
| 2119624 | 11/1983 | United Kingdom . |

OTHER PUBLICATIONS

Asgher et al., J. Sci. Food Agri., vol. 57, pp. 31–41, 1991.
Dirinck et al., J. Agric. Food Chem., vol. 44, pp. 65–68, 1996.
Cheah et al, *Meat Science*, 39:255–264 (1995).
Pfalzgraf et al, *Fett Wissenschaft Technologie*, 97(1):13–20 (1995).
Monahan et al, *Farm and Food*, 2(3):10–11 (1992).

*Primary Examiner*—Chhaya D. Sayala
*Attorney, Agent, or Firm*—Sughrue, Mion, Zinn, MacPeak & Seas, PLLC

[57] ABSTRACT

A swine feed containing as additives a spice and 50–500 ppm of vitamin E. A method for producing pork with improved quality by raising swine with such a feed is also disclosed. When swine are raised with the feed of the present invention, it is possible to produce pork which gives less smell, maintains freshness and quality for prolonged periods, generates less drip, and exhibits good moisture retainability. Moreover, the growth rate of the swine is excellent.

8 Claims, No Drawings

SWINE FEED CONTAINING VITAMIN E AND SPICE

BACKGROUND OF THE INVENTION

1. Field of the Invention

The present invention relates to feed for raising swine which grow well and are capable of producing meat of good quality.

2. Description of the Related Art

In recent years, consumption of livestock meat has been increasing. Among livestock meat, pork is desired to have less smell, maintain its freshness and quality for prolonged periods, generate less drip, and exhibit good moisture retainability.

Hitherto, attempts have been made to add a variety of additives to feed so as to improve the quality, the taste and the smell, etc. of livestock meat. For example, GB Nos. 2119624A and 2118420A, Japanese Patent Application laid-open (kokai) Nos. 63-266, 5-276878 and 7-31382, EP No. 0635217A, and U.S. Pat Nos. 4,665,099 and 4,820,739 discloses a method for improving the quality and the smell of meat by feeding livestock or poultry feed containing spices or refined oil thereof. However, a simple addition of spices or refined oil thereof provides only limited improvement in smell and shelf life. Particularly, reduction in volume of drip and enhancement of moisture retainability are far from satisfactory.

Under the above circumstances, the present inventors conducted careful studies in an attempt to solve the above-described problem, and found that when swine are bred with feed that contains spices and vitamin E as additives, it is possible to obtain pork meat which gives less smell, maintains freshness and quality for prolonged periods, generates less drip, and exhibits good moisture retainability, compared to the case where swine are bred with a feed that contains either spices or vitamin E. Moreover, swine fed with such feed grow an excellent manner.

Although Japanese Patent Application Laid-Open (kokai) No. 6-14723 discloses a method for obtaining low-fat chicken meat by breeding chickens with a diet which contains spices—garlic, ginger, oregano, and cinnamon— and vitamin E, the above-described improvement of pork quality attained by the present invention cannot be conceived from the teaching of this publication, as chicken meat has an aging period (i.e., the required time after slaughter for the meat to become suitable for consumption) as short as 0.5 days, as distinguished from the case of pork, which requires about 5 days for aging, and therefore, drip is not very problematic in the case of chicken meat.

SUMMARY OF THE INVENTION

Accordingly, the present invention is generally directed to a feed which is capable of producing pork that has less smell, maintains its freshness for prolonged periods, has extended shelf life, generates less drip, and exhibits excellent moisture retainability.

In one aspect of the present invention, there is provided a feed for swine which contains, as additives, a spice and 50–500 ppm of vitamin E.

In another aspect of the present invention, there is provided a method for producing pork of improved quality, which method comprises breeding a swine with such a feed.

In still another aspect of the present invention, there is provided a method of raising swine, which method comprises feeding the above-mentioned feed to the swine.

These and other objects, features, and advantages of the present invention will become apparent from the following description.

DESCRIPTION OF PREFERRED EMBODIMENTS

As used herein, the term "spice" or "spices" is used to broadly refer to both herbs and spices; herbs having unique appreciable odors and growing mainly on the Mediterranean coasts, and spices giving strong aromas and stimulative effects and being produced in tropical and subtropical zones. More specifically, by the term "spice" or "spices" is indicated whole plants or herbs that contain spicy ingredients; dry or pulverized products of such plants or herbs; pelletized forms thereof; as well as essential oils extracted from spices.

Spices inherently have unique functions: appetite-promoting effect attributed to their aromas and stimulative effect of imparting hot taste, masking of disagreeable smell of fish and meat due to chemical effect and aromas of the spices, good odor-imparting effect, and coloring with dyes unique to spices. Moreover, some spices provide, in addition to aromas and hot tastes as mentioned above, preservative effect, physiological or pharmacological effect, etc.

The spices used in the present invention are selected from among a variety of families including Myristicaceae, Cruciferae, Rutaceae, Pedaliaceae, Piperaceae, Umbelliferae, Myrtaceae, Salanaceae, Labiatae, Lauraceae, Liliaceae, Zingiberaceae, Compositae, and Camellia. Specific examples of spices include nutmeg, mace, mustard, tarragon, sesame, black pepper, white pepper, fenugreek, aniseed, celery seed, caraway, coriander, cumin, fennel, dill, parsley, paprika, cloves, allspice, red chili, marjoram, rosemary, oregano, sage, thyme, laurel, basil, savory, cinnamon, onion, turmeric, cardamon, ginger, garlic, wormwood, and tea. Of these, preferred spices are nutmeg, cloves, rosemary, oregano, sage, cinnamon, ginger, wormwood, and tea, with nutmeg, oregano, cinnamon, ginger, and sage being particularly preferred.

The swine feed of the present invention may contain one or more species of the above-described spices. The spices may be incorporated into feed in various forms. For example, whole spices may be used in forms in which they are collected from trees, or they may be used after being dried or pulverized. Alternatively, they may be incorporated into feed after being formed into pellets with or without use of a vehicle. Essential oils extracted from natural spices may also be used in the present invention.

The amount of spices to be incorporated into the feed of the present invention varies depending on the species and form of the spice(s). When natural spices are used, they are preferably incorporated in amounts of 0.1–5% by weight (hereinafter simply referred to as %) of feed on a dry basis, whereas when essential oils are used, they are preferably incorporated in amounts of 0.001–1% by weight. If the amount of spices contained in feed is less than the lower limits, the improvement in quality of meat is not satisfactory. On the other hand, if the amount of spices is higher than the upper limits, notable improvement can no longer be obtained. Moreover, such a high amount is not preferred from the standpoint of nutritional balance. Regarding vitamin E, it is contained in the feed in amounts of 50–500 ppm, preferably 50–200 ppm, more preferably 100–200 ppm.

When spices and vitamin E are incorporated into feed, they may be blended simultaneously with other raw materials. However, considering that the amount of spices and vitamin E is small, it is preferred that they first be blended with a portion of starting materials of feed to prepare a feed additive, which is then added to the remaining starting materials of feed. This allows uniform blending of spices and vitamin E.

The starting materials of feed to which spices and vitamin E are added are not particularly limited; customary starting materials generally used for preparing swine feed may be used in the present invention. Examples of such starting materials include grains such as corn, milo, barley, and wheat; chaff and bran such as wheat bran; oil seed meals such as soybean meal and rape seed meal; animal origin feed such as fish meal and meat and bone meal; common salt, oligosaccharides, silicic acid; vitamins; minerals such as calcium carbonate and dicalcium phophate; and amino acids and other organic acids. The feed for feeding swine according to the present invention is manufactured by blending these starting materials together with spices and vitamin E, and forming pellets, mush, or crumbles.

The present invention will next be described by way of examples, which should not be construed as limiting the invention.

EXAMPLE 1

Swine were bred with the feeds shown in Table 1, and their growth was monitored. Moreover, the quality of the produced pork meat was assessed in terms of drip, moisture retainability, thiobarbituric acid (TBA) value, and smell.

(1) Feed

Ingredients of the feeds employed are shown in Table 1.

TABLE 1

| Ingredient (%) | Comp. Ex. 1 (Basal diet) | Comp. Ex. 2 | Comp. Ex. 3 | Ex. 1 |
|---|---|---|---|---|
| Maize | 814.5 | 814.5 | 813.5 | 813.5 |
| Bran | 9.5 | 9.5 | 9.5 | 9.5 |
| Soybean meal | 135.0 | 135.0 | 135.0 | 135.0 |
| Wholemeal (Fish meal) | 20.0 | 20.0 | 20.0 | 20.0 |
| Calcium carbonate | 7.0 | 7.0 | 7.0 | 7.0 |
| Dicalcium phosphate | 9.0 | 9.0 | 9.0 | 9.0 |
| Common salt | 2.5 | 2.5 | 2.5 | 2.5 |
| Fat-soluble flavor |  |  | 0.4 | 0.4 |
| Cinnamon |  |  | 0.3 | 0.3 |
| Nutmeg |  |  | 0.1 | 0.1 |
| Ginger |  |  | 0.1 | 0.1 |
| Oregano |  |  | 0.1 | 0.1 |
| Vitamin preparation contg. 0.07% Vitamin E | 2.5 |  | 2.5 |  |
| Vitamin preparation contg. 4% Vitamin E |  | 2.5 |  | 2.5 |
| Total | 1000.0 | 1000.0 | 1000.0 | 1000.0 |
| Vitamin E content in the whole feed (ppm) (including Vitamin E in the basal diet) | 27 | 125 | 27 | 125 |

(2) Breeding Conditions

Test swine: Meat swine of about 72 kg

Manner of breeding:

Feeding with a single type of feed.

Feed and water was offered ad libitum.

Period of breeding: 42 days (3) Test Method a) Drip

Loin meat was cut immediately after slaughtering in a thickness of 0.5 cm. The cut pieces were placed in a container, which was then wrapped and stored in a cool room (4° C.) for 8 days. The moisture loss at the end of the 8-day-storage is shown as the percentage with respect to the initial weight of the piece of meat.

b) Moisture Retainability

Loin meat (about 10 g) was centrifuged at high speed (13,000 rpm×30 min.) immediately after slaughtering. The percentage of the residual moisture content relative to the moisture content of the raw meat is used as the index of moisture retainability.

c) TBA Value

The TBA value of loin stored in a cool room for 8 days was measured.

The measurement was performed so as to cause a reaction between malondialdehyde or acetal compounds (which are formed due to oxidation of fats) and thiobarbituric acid, and to determine the level of the developed color. The greater the value, the higher the oxidation.

d) Intensity of Smell

The smell of loin of the carcass was measured immediately after slaughtering, by use of a smell-discernment apparatus (model FA-KB201; by Kirin Brewery Co., Ltd.).

(4) Results

The results are shown in Tables 2 and 3.

TABLE 2

|  | Drip from loin (%) | Moisture retention (*) | TBA of loin (nmol/g) | Intensity of smell of loin |
|---|---|---|---|---|
| Comp. Ex. 1 | 12.8 ± 0.51 a | 69.9 ± 0.73 a | 3.8 ± 0.78 a | 10.8 ± 0.80 a |
| Comp. Ex. 2 | 11.6 ± 0.42 b | 72.2 ± 0.91 b | 2.1 ± 0.13 b | 9.0 ± 0.98 b |
| Comp. Ex. 3 | 11.4 ± 0.55 c | 72.4 ± 0.64 c | 2.3 ± 0.39 c | 8.7 ± 0.75 c |
| Ex. 1 | 8.8 ± 0.32 d | 77.1 ± 0.79 d | 0.3 ± 0.04 d | 5.8 ± 0.96 d |

Note)
Regarding drip, TBA value, and smell intensity, there are statistically significant differences at the level of $P < 0.01$ between a and d, b and d, and c and d, and at the level of $P < 0.05$ between a and b, and a and c; and regarding moisture retainability, there are statistically significant differences at the level of $P < 0.01$ between a and d, b and d, and c and d, and at the level of $P < 0.01$ between a and b, and a and c.

TABLE 3

|  | Comp. Ex. 1 | Comp. Ex. 2 | Comp. Ex. 3 | Ex. 1 |
|---|---|---|---|---|
| Body weight when test started (kg) | 71.6 ± 2.30 | 71.8 ± 0.53 | 72.1 ± 0.41 | 72.3 ± 0.90 |
| Body weight when test ended (kg) | 101.3 ± 2.32 a | 102.5 ± 2.39 b | 104.9 ± 1.69 c | 107.3 ± 1.55 d |
| Gain of body weight (g) | 706 ± 92 a | 731 ± 65 b | 781 ± 44 c | 834 ± 36 d |
| Feed intake (g) | 2459 | 2446 | 2571 | 2639 |
| Feed conversion ratio | 3.48 | 3.35 | 3.29 | 3.16 |

Note)
Regarding the weight at the end of test, there are statistically significant differences between a and d at the lever of $P < 0.01$; between b and d at the level of $P < 0.05$; and between a and c at the level of $P < 0.05$. Regarding the weight gain, there are statistically significant differences between a and d, and b and d at the level of $P < 0.05$.

EXAMPLE 2

In a manner similar to that of Example 1, swine were bred with the feeds shown in Table 4. The growth of the swine was monitored. Moreover, the quality of the produced pork meat was assessed in terms of drip, moisture retainability, and thiobarbituric acid (TBA) value. The results of the evaluation of the quality of meat are shown in Table 5, and factors indicative of the growth are shown in Table 6.

TABLE 4

| Ingredient (%) | Comp. Ex. 1 (Basal diet) | Comp. Ex. 2 | Comp. Ex. 3 | Ex. 1 |
| --- | --- | --- | --- | --- |
| Maize | 814.5 | 814.5 | 804.5 | 804.5 |
| Bran | 9.5 | 9.5 | 9.5 | 9.5 |
| Soybean meal | 135.0 | 135.0 | 135.0 | 135.0 |
| Wholemeal (Fish meal) | 20.0 | 20.0 | 20.0 | 20.0 |
| Calcium carbonate | 7.0 | 7.0 | 7.0 | 7.0 |
| Dicalcium phosphate | 9.0 | 9.0 | 9.0 | 9.0 |
| Common salt | 2.5 | 2.5 | 2.5 | 2.5 |
| Spice (sage) | | | 10.0 | 10.0 |
| Vitamin preparation contg. 0.07% Vitamin E | 2.5 | | 2.5 | |
| Vitamin preparation contg. 4% Vitamin E | | 2.5 | | 2.5 |
| Total | 1000.0 | 1000.0 | 1000.0 | 1000.0 |
| Vitamin E content in the whole feed (ppm) (including Vitamin E in the basal diet) | 27 | 125 | 27 | 125 |

TABLE 5

| | Drip from loin (%) | Moisture retention (%) | TBA of loin (nmol/g) |
| --- | --- | --- | --- |
| Comp. Ex. 4 | 12.6 ± 0.68 e | 70.0 ± 1.50 e | 4.2 ± 1.02 e |
| Comp. Ex. 5 | 11.6 ± 0.42 f | 76.7 ± 1.53 f | 2.6 ± 0.39 f |
| Comp. Ex. 6 | 11.4 ± 0.67 g | 76.8 ± 0.85 g | 2.5 ± 0.59 g |
| Ex. 2 | 8.4 ± 0.91 h | 79.3 ± 1.28 h | 0.9 ± 0.18 h |

Note)
Regarding the drip, there are statistically significant differences between e and h at a level of $P < 0.01$; f and h, and g and h at the level of $P < 0.05$; and e and f, and e and g at the level of $P < 0.05$.
Regarding the moisture retainability, there are statistically significant differences between e and h at a level of $P < 0.01$; f and h, and g and h at the level of $P < 0.05$; and e and f, and e and g at the level of $P < 0.01$.
Regarding the TBA value, there are statistically significant differences at the level of $P < 0.01$ between e and h, f and h, and g and h; and at the level of $P < 0.05$ between e and f, and e and g.

TABLE 6

| | Comp. Ex. 4 | Comp. Ex. 5 | Comp. Ex. 6 | Ex. 2 |
| --- | --- | --- | --- | --- |
| Body weight when test started (kg) | 70.7 ± 3.34 | 70.5 ± 3.23 | 70.5 ± 3.52 | 70.5 ± 3.25 |
| Body weight when test ended (kg) | 97.3 ± 2.97 e | 99.3 ± 3.75 f | 101.4 ± 3.42 g | 105.0 ± 2.19 h |
| Gain of body weight (g) | 783.8 ± 81.4 e | 848.5 ± 72.8 f | 908.8 ± 62.1 g | 1014.0 ± 46.8 h |
| Feed intake (g) | 3272 | 3219 | 3384 | 3463 |
| Feed conversion ratio | 4.17 | 3.79 | 3.72 | 3.42 |

Note)
Regarding the weight at the end of test, there are statistically significant differences between e and h, and f and h at the level of $P < 0.01$; between g and h at the level of $P < 0.05$; and between e and g at the level of $P < 0.05$. Regarding the weight gain, there are statistically significant difference between e and h, and f and h at the level of $P < 0.01$; between g and h at the level of $P < 0.05$; and between e and g at the level of $P < 0.01$.

As the results of Examples 1 and 2 clearly show, when swine are raised with the feed according to the present invention, it is possible to obtain pork meat which gives less smell, maintains freshness and quality for prolonged periods, generates less drip, and exhibits better moisture retrainability, compared to the case where swine are bred with a feed containing either of spices and vitamin E. Moreover, swine feed with such feed grow excellently.

As described hereinabove, when swine are raised with a feed containing as additives spices and vitamin E, it is possible to obtain pork meat which gives less smell, maintains freshness and quality for prolonged periods, generates less drip, and exhibits good moisture retainability. Moreover, the growth rate of the swine is excellent.

What is claimed is:

1. A method for producing pork meat having improved quality, improved drip properties and improved moisture retainability, which method comprises, breeding swine with a swine feed comprising, as additives, a spice and 98–500 ppm of vitamin E, and obtaining pork meat from the resulting swine.

2. The method according to claim 1, wherein the spice is of a family selected from the group consisting of Myristicaceae, Cruciferae, Rutaceae, Pedaliaceae, Piperaceae, Umbelliferae, Myrtaceae, Salanaceae, Labiatae, Lauraceae, Liliaceae, Zingiberaceae, Compositae and Camellia.

3. The method according to claim 2, wherein the spice is selected from the group consisting of nutmeg, mace, mustard, tarragon, sesame, black pepper, white pepper, fenugreek, aniseed, celery seed, caraway, coriander, cumin, fennel, dill, parsley, paprika, cloves, allspice, red chili, marjoram, rosemary, oregano, sage, thyme, laurel, basil, savory, cinnamon, onion, turmeric, cardamon, ginger, garlic, wormwood and tea.

4. The method according to claim 3, wherein the spice is selected from the group consisting of nutmeg, oregano, cinnamon, ginger and sage.

5. A method for raising swine from which is produced pork meat having improved quality, improved drip properties and improved moisture retainability, which method comprises feeding, to swine, a swine feed which comprises, as additives, a spice and 98–500 ppm of vitamin E.

6. The method according to claim 5, wherein the spice is of a family selected from the group consisting of Myristicaceae, Cruciferae, Rutaceae, Pedaliaceae, Piperaceae, Umbelliferae, Myrtaceae, Salanaceae, Labiatae, Lauraceae, Liliaceae, Zingiberaceae, Compositae and Camellia.

7. The method according to claim 6, wherein the spice is selected from the group consisting of nutmeg, mace, mustard, tarragon, sesame, black pepper, white pepper, fenugreek, aniseed, celery seed, caraway, coriander, cumin, fennel, dill, parsley, paprika, cloves, allspice, red chili, marjoram, rosemary, oregano, sage, thyme, laurel, basil, savory, cinnamon, onion, turmeric, cardamon, ginger, garlic, wormwood and tea.

8. The method according to claim 7, wherein the spice is selected from the group consisting of nutmeg, oregano, cinnamon, ginger and sage.

\* \* \* \* \*